(12) United States Patent
Choi

(10) Patent No.: US 8,196,954 B2
(45) Date of Patent: Jun. 12, 2012

(54) PASSENGER SEAT AIR-BAG MODULE

(75) Inventor: Jun Yeol Choi, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 292 days.

(21) Appl. No.: 12/622,361

(22) Filed: Nov. 19, 2009

(65) Prior Publication Data

US 2011/0049849 A1 Mar. 3, 2011

(30) Foreign Application Priority Data

Aug. 25, 2009 (KR) ........................ 10-2009-0078653

(51) Int. Cl.
*B60R 21/207* (2006.01)
*B60R 21/215* (2011.01)
(52) U.S. Cl. .................................. 280/728.3; 280/730.2
(58) Field of Classification Search ............... 280/730.2, 280/728.1, 728.2, 728.3, 731, 732, 742, 743.1, 280/743.2; 297/216.1
See application file for complete search history.

(56) References Cited

U.S. PATENT DOCUMENTS

| | | | | |
|---|---|---|---|---|
| 5,407,227 A * | 4/1995 | Lauritzen et al. | .......... | 280/728.1 |
| 5,478,105 A * | 12/1995 | Yamakawa et al. | ......... | 280/728.3 |
| 5,651,582 A * | 7/1997 | Nakano | ................... | 297/216.13 |
| 5,667,242 A * | 9/1997 | Slack et al. | ................ | 280/730.2 |
| 5,791,680 A * | 8/1998 | Dyer | .......................... | 280/728.3 |
| 5,799,970 A * | 9/1998 | Enders | ....................... | 280/730.2 |
| 5,803,490 A * | 9/1998 | Seventko et al. | ........... | 280/730.2 |
| 5,845,930 A * | 12/1998 | Maly et al. | ................. | 280/728.3 |
| 5,845,932 A * | 12/1998 | Kimura et al. | ............. | 280/730.2 |
| 5,979,979 A * | 11/1999 | Guerinot et al. | ......... | 297/216.13 |
| 5,988,674 A * | 11/1999 | Kimura et al. | ............. | 280/730.2 |
| 6,070,904 A * | 6/2000 | Ozaki et al. | ................ | 280/743.1 |
| 6,155,593 A * | 12/2000 | Kimura et al. | ............. | 280/728.2 |
| 6,173,988 B1 * | 1/2001 | Igawa | ........................ | 280/728.2 |
| 6,237,936 B1 * | 5/2001 | Quade et al. | ................ | 280/730.2 |
| 6,357,789 B1 * | 3/2002 | Harada et al. | ............. | 280/730.2 |
| 6,386,577 B1 * | 5/2002 | Kan et al. | ................... | 280/730.2 |
| 6,394,486 B1 * | 5/2002 | Fujimura et al. | .......... | 280/728.2 |
| 6,406,056 B2 * | 6/2002 | Yokota | ........................ | 280/728.2 |
| 6,467,798 B2 * | 10/2002 | Inomata et al. | ............ | 280/728.2 |
| 6,578,911 B2 * | 6/2003 | Harada et al. | ............. | 297/216.13 |
| 7,004,496 B2 * | 2/2006 | Bossecker et al. | ......... | 280/730.2 |
| 7,156,414 B2 * | 1/2007 | Hayashi et al. | ............. | 280/728.3 |
| 7,213,837 B2 * | 5/2007 | Clarke et al. | .................. | 280/731 |
| 7,314,228 B2 * | 1/2008 | Ishiguro et al. | ............. | 280/728.2 |
| 7,322,596 B2 * | 1/2008 | Nakazawa et al. | ......... | 280/728.2 |
| 7,530,597 B2 * | 5/2009 | Bito | ............................. | 280/742 |

(Continued)

FOREIGN PATENT DOCUMENTS

JP 9-118187 A 5/1997

*Primary Examiner* — Paul N Dickson
*Assistant Examiner* — Karen A Beck
(74) *Attorney, Agent, or Firm* — Morgan, Lewis & Bockius LLP

(57) ABSTRACT

A passenger seat air-bag module, may include a cushion plate on which an air-bag cushion is provided, the cushion plate mounted to a vehicle body, an inflator unit secured to the cushion plate and providing gas pressure to the air-bag cushion, and a seat cover secured at a first side thereof to the inflator unit and the cushion plate and secured at a second side thereof to the cushion plate to cover an outer portion of the air-bag cushion.

14 Claims, 9 Drawing Sheets

U.S. PATENT DOCUMENTS

| | | | |
|---|---|---|---|
| 7,631,894 B2* | 12/2009 | Hasebe et al. | 280/743.2 |
| 7,712,772 B2* | 5/2010 | Muller | 280/730.2 |
| 7,753,407 B2* | 7/2010 | Yokota | 280/743.2 |
| 7,845,672 B2* | 12/2010 | Onohara | 280/728.3 |
| 7,883,105 B2* | 2/2011 | Smith | 280/730.2 |
| 2004/0195808 A1* | 10/2004 | Amamori | 280/728.2 |
| 2005/0048904 A1* | 3/2005 | Lee | 454/127 |
| 2005/0212269 A1* | 9/2005 | Schneider | 280/728.3 |
| 2007/0241541 A1* | 10/2007 | Miwa et al. | 280/728.2 |
| 2008/0073952 A1* | 3/2008 | Tracht et al. | 297/216.13 |
| 2009/0152842 A1* | 6/2009 | Benny et al. | 280/728.3 |
| 2009/0289441 A1* | 11/2009 | Kakstis et al. | 280/728.1 |
| 2009/0302582 A1* | 12/2009 | Koyama et al. | 280/728.2 |
| 2010/0090445 A1* | 4/2010 | Williams et al. | 280/728.2 |
| 2010/0194083 A1* | 8/2010 | Sugimoto et al. | 280/730.2 |
| 2010/0230935 A1* | 9/2010 | Rose et al. | 280/728.2 |
| 2010/0253048 A1* | 10/2010 | Ooshino et al. | 280/728.2 |
| 2010/0327566 A1* | 12/2010 | Matsushima | 280/728.2 |
| 2011/0025034 A1* | 2/2011 | Lim et al. | 280/743.2 |
| 2011/0049849 A1* | 3/2011 | Choi | 280/730.2 |
| 2011/0115200 A1* | 5/2011 | Choi et al. | 280/728.2 |
| 2011/0193328 A1* | 8/2011 | Fukawatase | 280/730.2 |
| 2011/0241317 A1* | 10/2011 | Lee | 280/729 |
| 2011/0260432 A1* | 10/2011 | Matsushima | 280/730.2 |

* cited by examiner

PASSENGER SEAT AIR-BAG MODULE

CROSS-REFERENCE TO RELATED APPLICATIONS

The present application claims priority to Korean Patent Application Number 10-2009-0078653 filed on Aug. 25, 2009, the entire contents of which application is incorporated herein for all purpose by this reference.

BACKGROUND OF THE INVENTION

1. Field of the Invention

The present invention relates generally to a passenger seat air-bag module and, more particularly, to a passenger seat air-bag module, which has a simple structure enabling a seat cover to cover an air-bag cushion, thus reducing manufacturing costs and the number of assembling processes.

2. Description of Related Art

Generally, air-bags for vehicles are classified into several types of air-bags according to the position in which they are mounted. That is, air-bags for vehicles include a driver seat air-bag, which is mounted in a steering wheel so as to protect a driver, a passenger seat air-bag which is mounted in a dash panel so as to protect a passenger sitting in a passenger seat, a side air-bag which protects a passenger from side impact, and other air-bags.

As shown in FIG. 10, the passenger seat air-bag module includes an inflator, a lower housing 10, an upper housing 20, and a retainer 21. The inflator generates gas in the event of a vehicle collision and is installed in the lower housing 10. The upper housing 20 is coupled with the lower housing 10 and receives an air-bag therein. The retainer 21 is secured to the inner surface of the upper housing 20 to support the air-bag.

Further, a longitudinal bracket 22 is provided along a longitudinal edge of the upper housing 20, while a side bracket 23 is provided on a transverse side of the upper housing 20. A mounting bracket 11 is provided on the lower portion of the lower housing 10 to be locked to a cowl cross member of a vehicle body.

However, the conventional passenger seat air-bag module is problematic in that each of the lower housing and the upper housing has a structure having a receiving space, so that the structure is complicated and weight is increased. Moreover, the inflator, the lower housing, the upper housing, and the retainer use separate fastening members, so that the number of assembling processes is undesirably increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a passenger seat air-bag module, which has a simple structure enabling a seat cover to cover an air-bag cushion, thus reducing the number of parts and the number of assembling processes.

In an aspect of the present invention, the passenger seat air-bag module, may include a cushion plate on which an air-bag cushion is provided, the cushion plate mounted to a vehicle body, an inflator unit secured to the cushion plate and providing gas pressure to the air-bag cushion, and a seat cover secured at a first side thereof to the inflator unit and the cushion plate and secured at a second side thereof to the cushion plate to cover an outer portion of the air-bag cushion.

A front hook piece and a rear bracket which are bent outwards may be provided, respectively, on front and rear edges of the cushion plate respectively, wherein the front hook piece is provided on the front edge of the cushion plate to fasten the second side of the seat cover and the rear bracket is provided on the rear edge of the cushion plate to fasten the first side of the seat cover and/or mount the cushion plate to the vehicle body.

The second side of the seat cover may include a longitudinal seat cover having a front hook hole into which the front hook piece is inserted and fastened thereto.

The rear bracket may include a rear hook piece for catching and fastening the first side of the seat cover, and/or a fastening bracket for fastening the cushion plate to the vehicle body, wherein rear hook holes are formed in the first side of the seat cover and the first side of the seat cover is fastened to the cushion plate while the rear hook piece is coupled to the first side of the seat cover through the rear hook holes.

In another aspect of the present invention, the passenger seat air-bag module may further include a side bracket provided on each of opposite lateral side edges of the cushion plate and bent outwards to fasten the cushion plate to the vehicle body, wherein the second side of the seat cover includes a transverse seat cover having a subsidiary hook hole into which the side bracket is inserted and fastened thereto.

A subsidiary hook piece which is bent inwards may be provided on each of the opposite lateral side edges of the cushion plate to catch and fasten lateral edges of the second side of the seat cover, wherein the second side of the seat cover includes a transverse seat cover having a subsidiary hook hole into which the subsidiary hook piece is inserted and fastened thereto.

In further another aspect of the present invention, the passenger seat air-bag module may further include a mounting bracket mounted to the cushion plate to lock the cushion plate to a cowl cross member, wherein the inflator unit includes, an inflator for providing the gas pressure to the air-bag cushion, an inflator bracket mounting the inflator thereon, and a fastening member fastening the inflator bracket to the cushion plate, wherein the fastening member passes through the inflator bracket, the first side of the seat cover, the cushion plate, and the mounting bracket to assemble the inflator bracket, the seat cover, the cushion plate, and the mounting bracket with each other, and wherein an inflator hole corresponding to the inflator unit and a fastening hole fastened to the cushion plate via the fastening member are formed in the first side of the seat cover.

In another aspect of the present invention, the inflator unit may include an inflator for providing the gas pressure to the air-bag cushion, an inflator bracket mounting the inflator thereon, and a fastening member fastening the inflator bracket to the cushion plate, wherein the fastening member passes through the inflator bracket, the first side of the seat cover and the cushion plate to assemble the inflator bracket, the seat cover and the cushion plate with each other, wherein an inflator hole corresponding to the inflator unit and a fastening hole fastened to the cushion plate via the fastening member are formed in the first side of the seat cover.

A tear seam may be formed on the second side of the seat cover so that the air-bag cushion is deployed through the tear seam in the event of a vehicle collision, and is formed in one shape selected from an "H" shape, a "U" shape, or an "I" shape.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
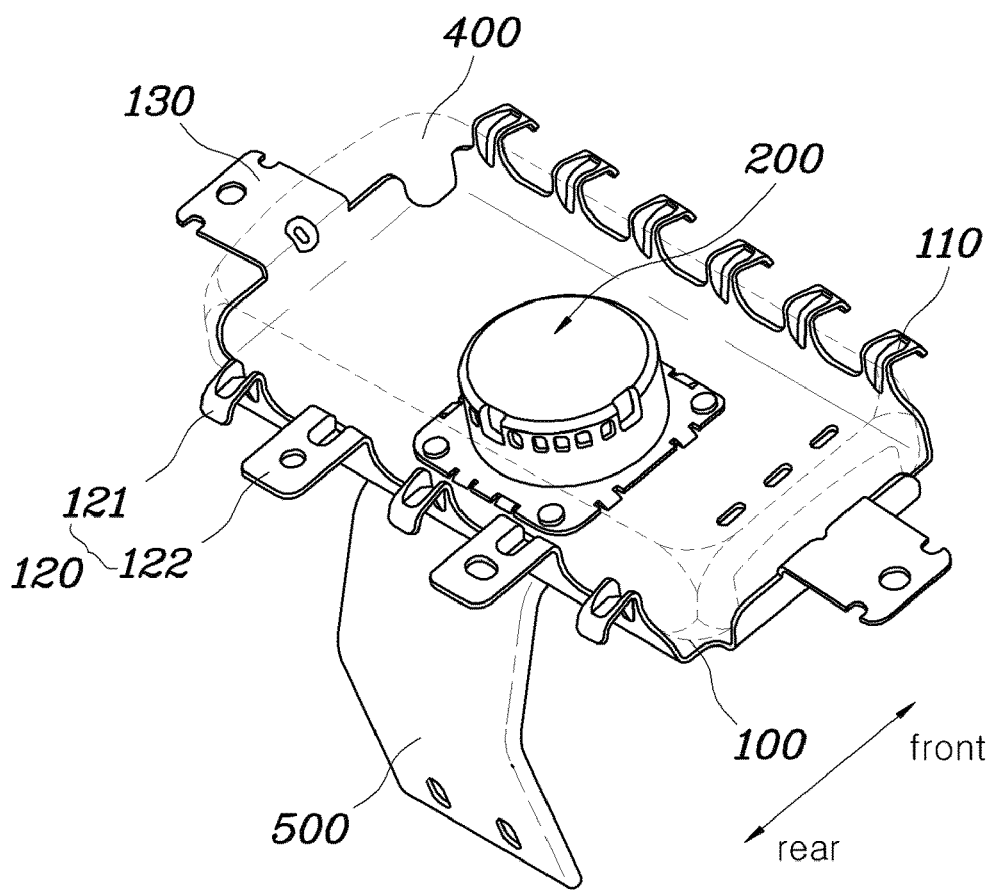
FIG. 1 is a perspective view illustrating a passenger seat air-bag module according to a first embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various exemplary embodiments of the present invention will be described below in detail with reference to the accompanying drawings.

Figure 2:
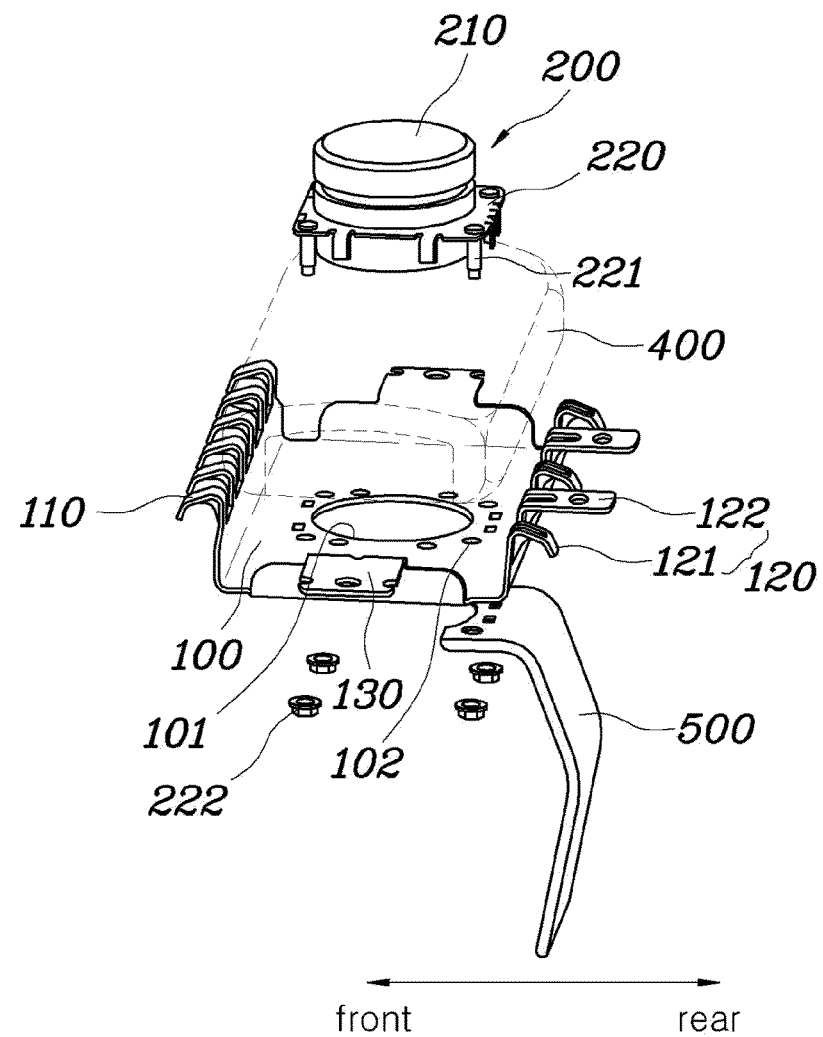
FIG. 2 is a perspective view illustrating the assembly of the passenger seat air-bag module according to the first embodiment of the present invention.
Figure 3:
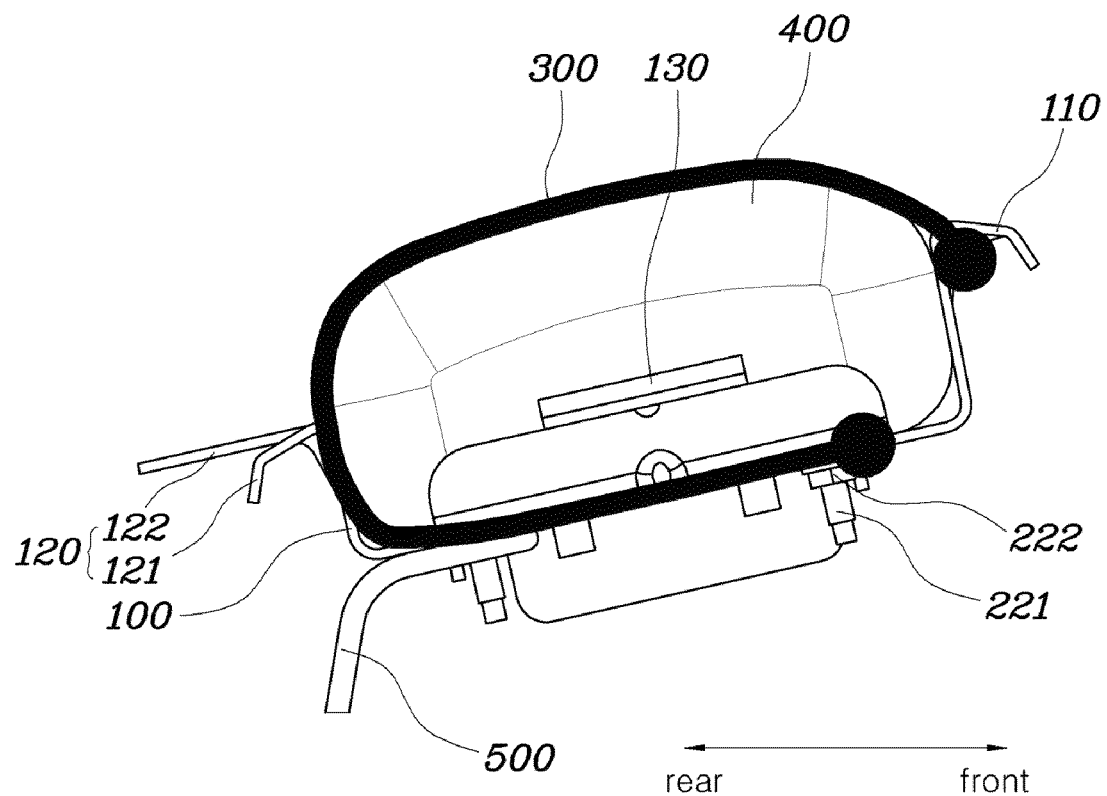
FIG. 3 is a side view illustrating the passenger seat air-bag module including a seat cover according to the first embodiment of the present invention.

As shown in FIGS. 1 to 3, a passenger seat air-bag module according to the first embodiment includes a cushion plate 100 on which an air-bag cushion 400 is provided, and a seat cover 300 which covers the air-bag cushion 400 and is secured to the cushion plate 100.

The cushion plate 100 is secured to a vehicle body. The air-bag cushion 400 is mounted to the cushion plate 100 with the air-bag cushion 400 being folded, and is expanded in the event of a vehicle collision.

A front hook piece 110 and a rear bracket 120 are provided, respectively, on the front and rear edges of the cushion plate 100 in such a way as to be bent. The rear bracket 120 includes rear hook pieces 121 and fastening brackets 122. Here, the rear hook piece 121 is bent in the shape of a hook to catch a first side 310 of the seat cover 300, and the fastening bracket 122 fastens the cushion plate 100 to the vehicle body using a fastening bolt (not shown).

Side brackets 130 which are bent are provided on both side edges of the cushion plate 100. Each side bracket 130 functions to fasten the cushion plate 100 to the vehicle body via a fastening bolt (not shown), in cooperation with the fastening bracket 122 of the rear bracket 120.

A mounting bracket 500 is mounted to the bottom of the cushion plate 100. The mounting bracket 500 extends downwards from the cushion plate 100 and is fastened to a cowl cross member (not shown) via a fastening bolt (not shown).

An inflator unit 200 is mounted to the cushion plate 100. The inflator unit 200 includes an inflator 210 and an inflator bracket 220. The inflator 210 provides gas pressure to the air-bag cushion 400 in the event of a vehicle collision. The inflator bracket 220 mounts the inflator 210 thereon and is fastened to the cushion plate 100 via fastening members 221. Further, an inflator hole 101 and fastening holes 102 are formed in the cushion plate 100. Thereby, the inflator 210 is seated in the inflator hole 101, and the fastening members 221 pass through the fastening holes 102.

Particularly, as shown in FIG. 2, the fastening members 221 pass through the seat cover 300, the cushion plate 100 and the mounting bracket 500 as well as the inflator bracket 220 and thereafter, nuts 222 are fastened to the fastening members 221. That is, the inflator bracket 220, the seat cover 300, the cushion plate 100 and the mounting bracket 500 may be assembled with each other at one time using the fastening members 221. Thus, the number of processes for assembling the inflator bracket 220, the seat cover 300, the cushion plate 100 and the mounting bracket 500 is reduced, so that a welding process which is susceptible to rust may be omitted.

The seat cover 300 is provided on the cushion plate 100 to cover the air-bag cushion 400 which is folded. The seat cover 300 restrains the folded air-bag cushion 400, and allows the air-bag cushion 400 to be smoothly deployed in the event of a vehicle collision.

Figure 4A:
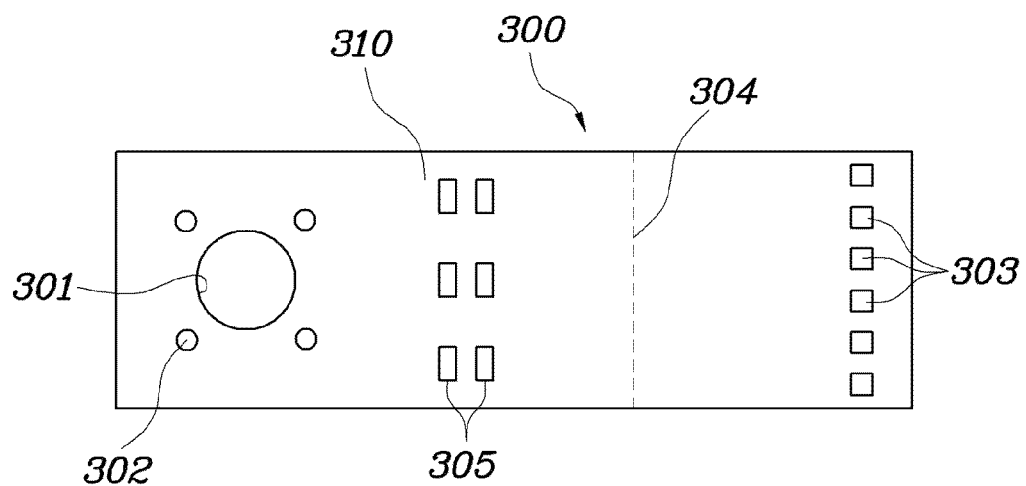
FIG. 4A is a development plan view illustrating the seat cover of the passenger seat air-bag module according to the first embodiment of the present invention.

As shown in FIG. 4A, an inflator hole 301 corresponding to the inflator unit 200 and fastening holes 302 through which the fastening members 221 of the inflator bracket 220 pass are formed in a first side 310 of the seat cover 300. Front hook holes 303 are formed in a second side 320 of the seat cover 300 so that the front hook piece 110 is inserted into and caught by the front hook holes 303. Further, a tear seam 304 is formed in a straight line on the second side 320 of the seat cover 300 in such a way as to go across the seat cover 300. The tear seam 304 may be torn by the expansive force of the air-bag cushion 400 in the event of a vehicle collision.

Rear hook holes 305 may be formed in the first side 310 of the seat cover 300 so that the rear hook piece 121 is inserted into and caught by the rear hook holes 305.

Figure 4B:
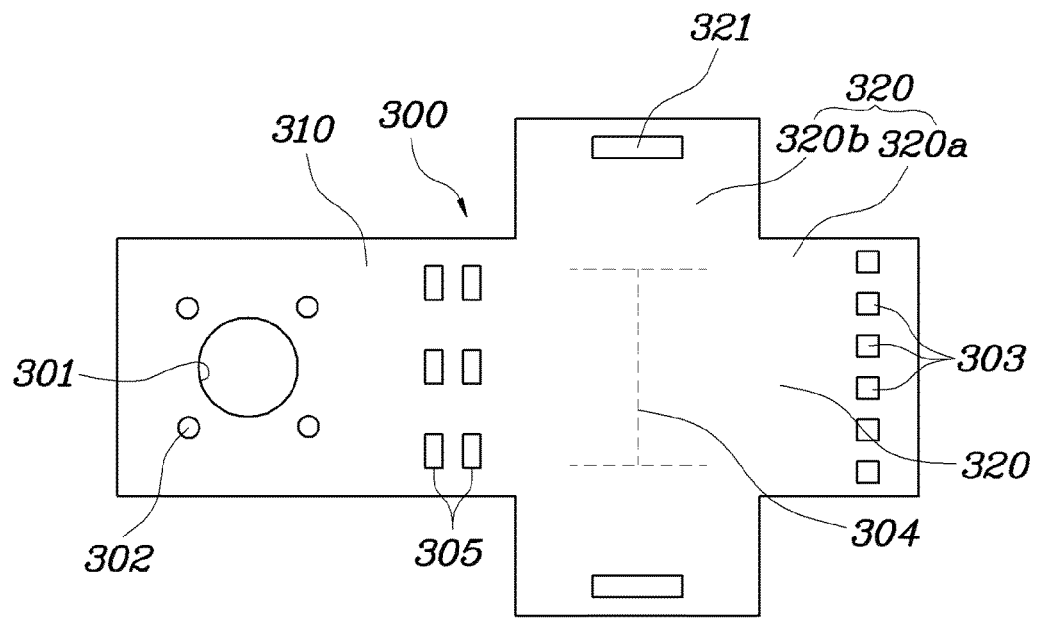
FIG. 4B is a development plan view illustrating a seat cover of the passenger seat air-bag module according to a modification of the first embodiment of the present invention.
Figure 5:
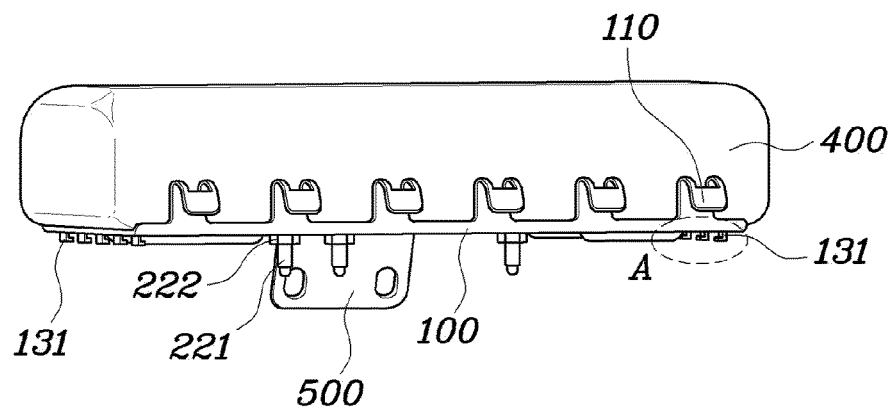
FIG. 5 is a perspective view illustrating a passenger seat air-bag module according to a second embodiment of the present invention.
Figure 6:
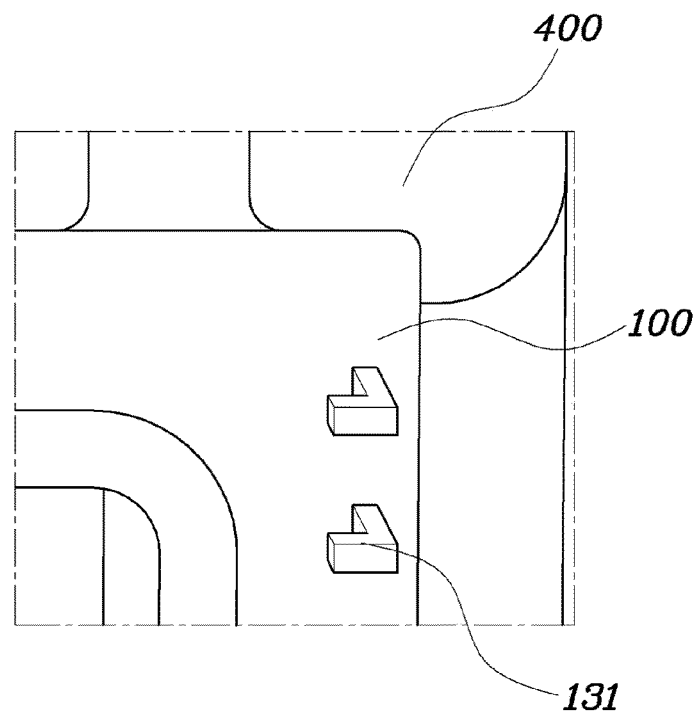
FIG. 6 is an enlarged view illustrating portion "A" of FIG. 5.
Figure 7A:
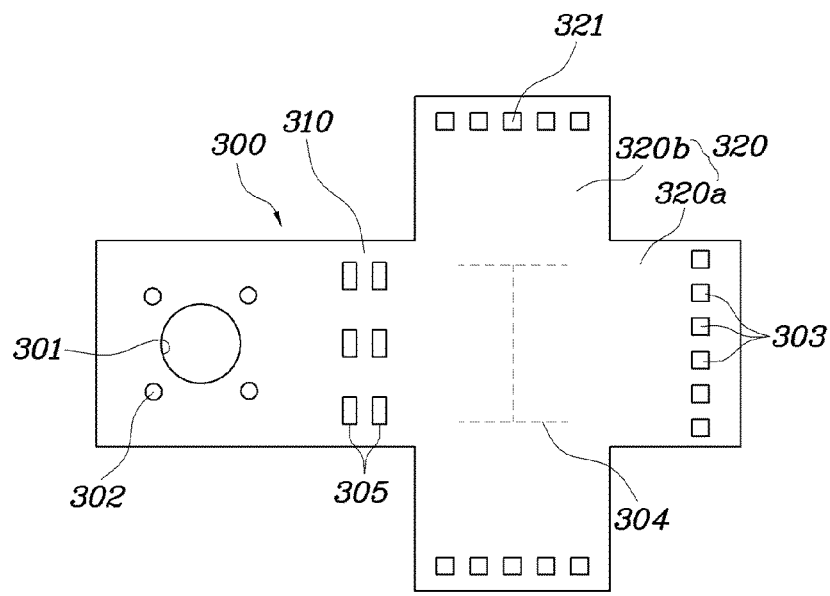
FIG. 7A is a development plan view illustrating a seat cover of the passenger seat air-bag module according to the second embodiment of the present invention.
Figure 7B:
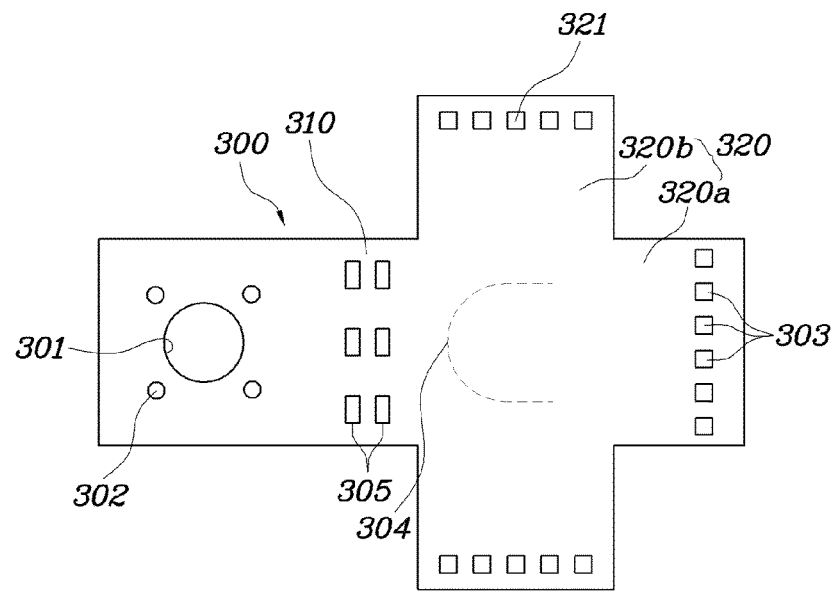
FIG. 7B is a development plan view illustrating a seat cover of the passenger seat air-bag module according to a modification of the second embodiment of the present invention.
Figure 7C:
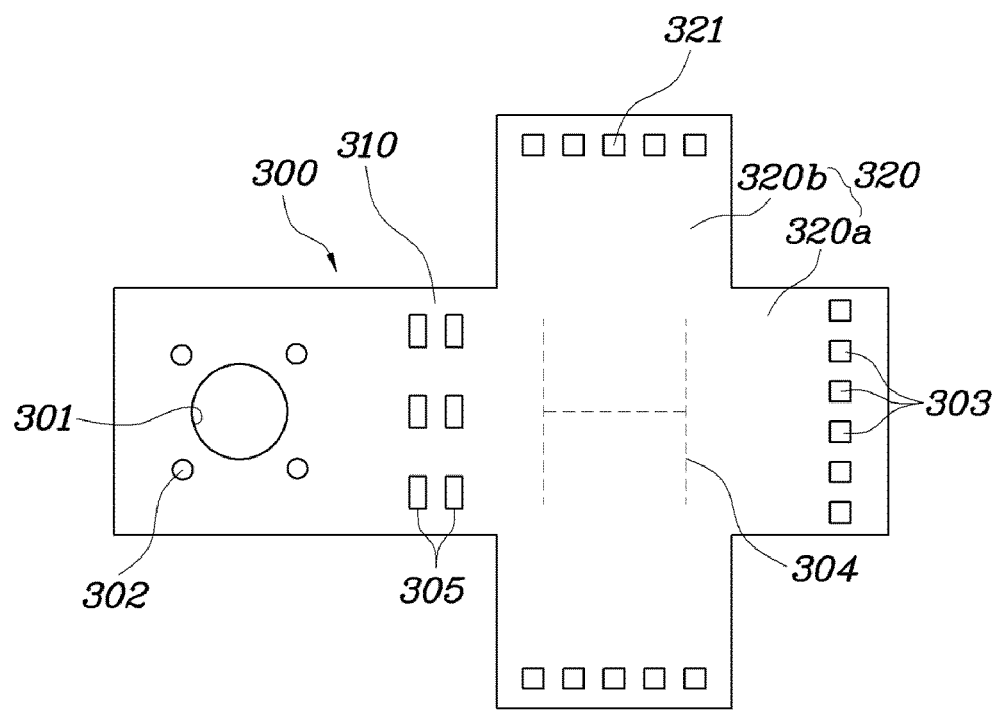
FIG. 7C is a development plan view illustrating a seat cover of the passenger seat air-bag module according to another modification of the second embodiment of the present invention.

As shown in FIG. 4B, subsidiary hook holes 321 may be formed in the second side 320 of the seat cover 300 to correspond to the side brackets 130, so that the side brackets 130 of the cushion plate 100 are inserted into and fastened to the subsidiary hook holes 321. The second side 320 of the seat cover 300 includes a longitudinal seat cover 320a having front hook holes 303 into which the front hook piece 110 is inserted, and transverse seat covers 320b having the subsidiary hook holes 321 into which the side brackets 130 are inserted.

Further, an "I"-shaped tear seam 304 is formed on the second side 320 of the seat cover 300. Since the tear seam 304 is torn and open by the expansive force of the air-bag cushion 400 in the event of a vehicle collision, the air-bag cushion 400 may be deployed through an open gap.

As shown in FIGS. 5 to 7A, according to the second embodiment, subsidiary hook pieces 131 may be provided on both side edges of the cushion plate 100 in such a way as to be bent, so that the second side 320 of the seat cover 300 is caught by the subsidiary hook pieces 131.

Here, the seat cover 300 has a cross shape. Particularly, the seat cover 300 includes a first side 310 which is fastened to the cushion plate 100 via the fastening members 221 of the inflator bracket 220, and a second side 320 to which the front hook piece 110 and the subsidiary hook pieces 131 are fastened. The second side 320 of the seat cover 300 includes a longitudinal seat cover 320a having front hook holes 303, and transverse seat covers 320b having subsidiary hook holes 321 into which the subsidiary hook pieces 131 are inserted.

The cross-shaped seat cover 300 entirely covers the air-bag cushion 400 to more firmly support it, thus reducing the entire volume of the air-bag module, and preventing the air-bag cushion 400 from being damaged because of foreign materials.

A tear seam 304 is formed on the second side 320 of the seat cover 300 so that the air-bag cushion 400 is deployed through the tear seam 304 in the event of a vehicle collision. The tear seam 304 may have an "F" shape of FIG. 7A, a "U" shape of FIG. 7B, or an "H" shape of FIG. 7C.

Figure 8:
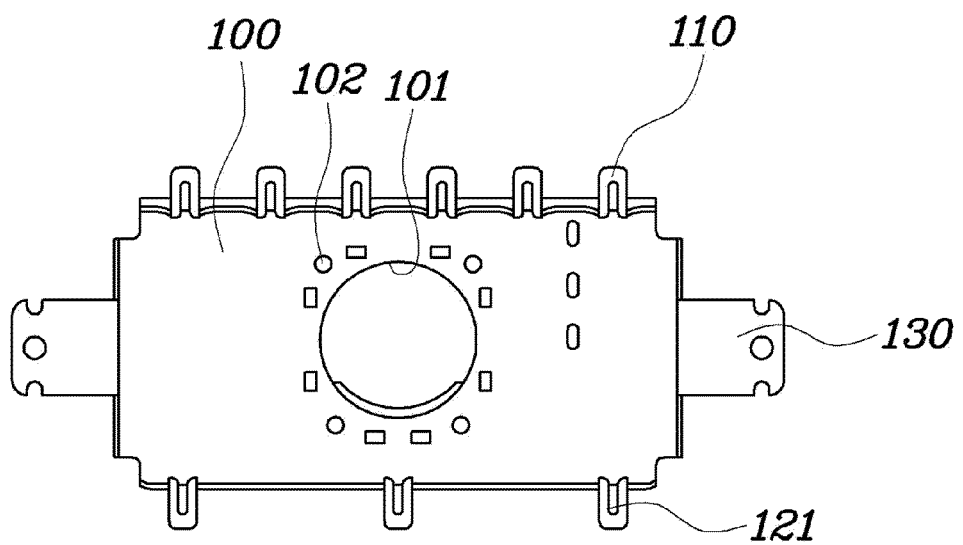
FIG. 8 is a plan view illustrating a passenger seat air-bag module according to a third embodiment of the present invention.

As shown in FIG. 8, according to the third embodiment, the front and rear brackets 110 and 120 which are bent are provided, respectively, on the front and rear edges of the cushion plate 100. The rear bracket 120 comprises rear hook pieces 121. That is, according to the third embodiment, the rear hook piece 121 is bent in the shape of a hook so that the first side 310 of the seat cover 300 is caught by the rear hook piece 121 through the rear hook holes 305.

Particularly, the cushion plate 100 according to the third embodiment is constructed so that only the front hook piece 110 and the rear hook pieces 121 are provided on the front and rear edges of the cushion plate 100 by removing the fastening brackets 122 from the rear bracket 120 of the first embodiment having the rear hook pieces 121 and the fastening brackets 122.

Figure 9:
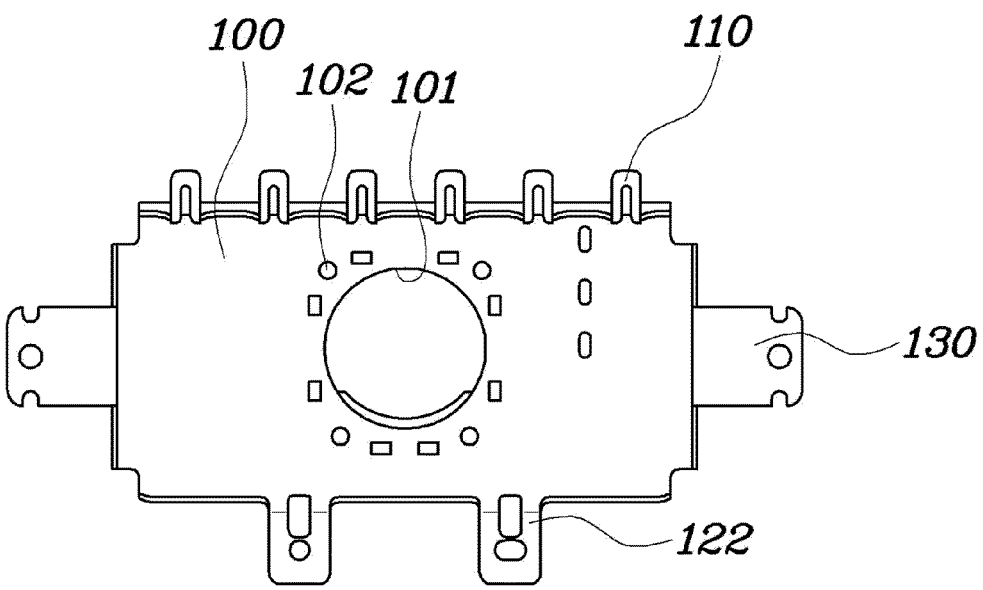
FIG. 9 is a plan view illustrating a passenger seat air-bag module according to a fourth embodiment of the present invention.
Figure 10:
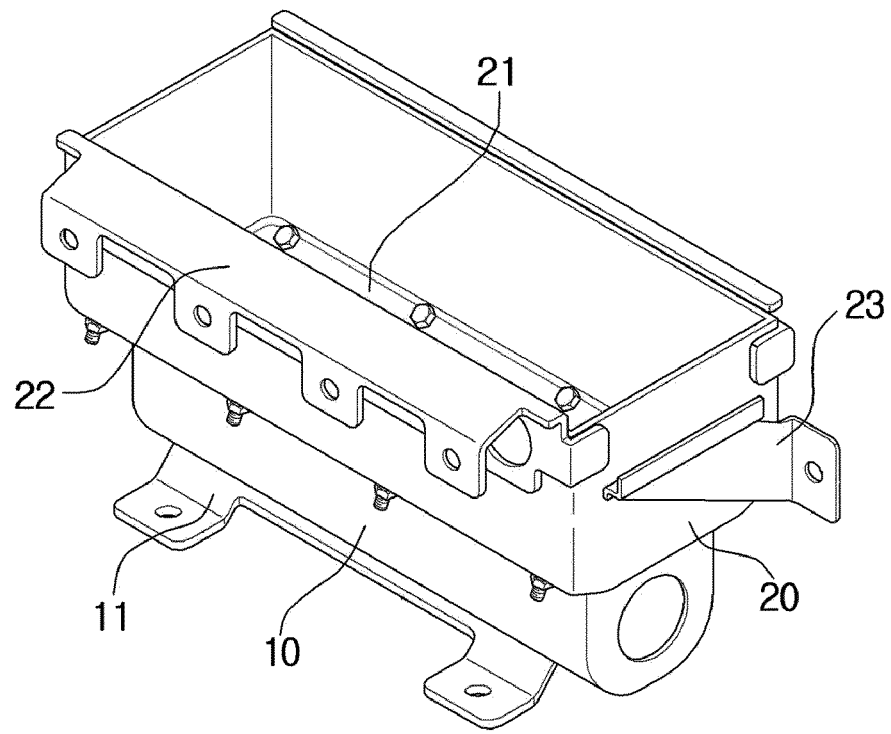
FIG. 10 is a perspective view illustrating the construction of a conventional passenger seat air-bag module.

As shown in FIG. 9, according to the fourth embodiment, the front and rear brackets 110 and 120 which are bent are provided on the front and rear edges of the cushion plate 100, and the rear bracket 120 comprises fastening brackets 122. That is, in the fourth embodiment, the front hook piece 110 is bent in the shape of a hook to catch the second side 320 of the seat cover 300.

Further, the cushion plate 100 according to the fourth embodiment is constructed so that only the front hook piece 110 and the fastening brackets 122 are provided on the front and rear edges of the cushion plate 100 by removing the rear hook pieces 121 from the rear bracket 120 of the first embodiment having the rear hook pieces 121 and the fastening brackets 122.

As described above, the present invention is advantageous in that a simple construction in which an air-bag cushion provided on a cushion plate is covered with a seat cover is achieved, thus reducing the number of parts, manufacturing costs and weight.

Further, the present invention is advantageous in that an inflator bracket, a seat cover, a cushion plate and a mounting bracket are assembled with each other at one time through the fastening member of the inflator bracket, thus reducing the number of assembling processes.

For convenience in explanation and accurate definition in the appended claims, the terms "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A passenger seat air-bag module, comprising:
    a cushion plate on which an air-bag cushion is provided, the cushion plate mounted to a vehicle body;
    an inflator unit secured to the cushion plate and providing gas pressure to the air-bag cushion; and
    a seat cover secured at a first side thereof to the inflator unit and the cushion plate and secured at a second side thereof to the cushion plate to cover an outer portion of the air-bag cushion;
    wherein a front hook piece and a rear bracket which are bent outwards are provided, respectively, on front and rear edges of the cushion plate respectively; and
    wherein the front hook piece is provided on the front edge of the cushion plate to fasten the second side of the seat cover and the rear bracket is provided on the rear edge of the cushion plate to fasten the first side of the seat cover and/or mount the cushion plate to the vehicle body.

2. The passenger seat air-bag module as set forth in claim 1, wherein the second side of the seat cover includes a longitudinal seat cover having a front hook hole into which the front hook piece is inserted and fastened thereto.

3. The passenger seat air-bag module as set forth in claim 1, wherein the rear bracket includes a rear hook piece for catching and fastening the first side of the seat cover, and/or a fastening bracket for fastening the cushion plate to the vehicle body.

4. The passenger seat air-bag module as set forth in claim 3, wherein rear hook holes are formed in the first side of the seat cover and the first side of the seat cover is fastened to the cushion plate while the rear hook piece is coupled to the first side of the seat cover through the rear hook holes.

5. The passenger seat air-bag module as set forth in claim 1, further comprising a side bracket provided on each of opposite lateral side edges of the cushion plate and bent outwards to fasten the cushion plate to the vehicle body.

6. The passenger seat air-bag module as set forth in claim 5, wherein the second side of the seat cover includes a transverse seat cover having a subsidiary hook hole into which the side bracket is inserted and fastened thereto.

7. The passenger seat air-bag module as set forth in claim 1, wherein a subsidiary hook piece which is bent inwards is provided on each of the opposite lateral side edges of the cushion plate to catch and fasten lateral edges of the second side of the seat cover.

8. The passenger seat air-bag module as set forth in claim 7, wherein the second side of the seat cover includes a transverse seat cover having a subsidiary hook hole into which the subsidiary hook piece is inserted and fastened thereto.

9. The passenger seat air-bag module as set forth in claim 1, further comprising a mounting bracket mounted to the cushion plate.

10. The passenger seat air-bag module as set forth in claim 9, wherein the inflator unit comprises:
   an inflator for providing the gas pressure to the air-bag cushion;
   an inflator bracket mounting the inflator thereon; and
   a fastening member fastening the inflator bracket to the cushion plate, wherein the fastening member passes through the inflator bracket, the first side of the seat cover, the cushion plate, and the mounting bracket to assemble the inflator bracket, the seat cover, the cushion plate, and the mounting bracket with each other.

11. The passenger seat air-bag module as set forth in claim 10, wherein an inflator hole corresponding to the inflator unit and a fastening hole fastened to the cushion plate via the fastening member are formed in the first side of the seat cover.

12. The passenger seat air-bag module as set forth in claim 1, wherein the inflator unit comprises:
   an inflator for providing the gas pressure to the air-bag cushion;
   an inflator bracket mounting the inflator thereon; and
   a fastening member fastening the inflator bracket to the cushion plate, wherein the fastening member passes through the inflator bracket, the first side of the seat cover and the cushion plate to assemble the inflator bracket, the seat cover and the cushion plate with each other.

13. The passenger seat air-bag module as set forth in claim 12, wherein an inflator hole corresponding to the inflator unit and a fastening hole fastened to the cushion plate via the fastening member are formed in the first side of the seat cover.

14. The passenger seat air-bag module as set forth in claim 1, wherein a tear seam is formed on the second side of the seat cover so that the air-bag cushion is deployed through the tear seam in the event of a vehicle collision, and is formed in one shape selected from an "H" shape, a "U" shape, or an "I" shape.

* * * * *